(12) United States Patent
Muscatell

(10) Patent No.: US 9,389,008 B2
(45) Date of Patent: Jul. 12, 2016

(54) SOLAR ENERGY AIR CONDITIONING SYSTEM WITH STORAGE CAPABILITY

(71) Applicant: Ralph Muscatell, Fort Lauderdale, FL (US)

(72) Inventor: Ralph Muscatell, Fort Lauderdale, FL (US)

(*) Notice: Subject to any disclaimer, the term of this patent is extended or adjusted under 35 U.S.C. 154(b) by 164 days.

(21) Appl. No.: 14/191,715

(22) Filed: Feb. 27, 2014

(65) Prior Publication Data

US 2014/0190195 A1  Jul. 10, 2014

Related U.S. Application Data

(60) Provisional application No. 61/851,712, filed on Mar. 13, 2013.

(51) Int. Cl.
*F25B 27/00* (2006.01)
*F04C 23/00* (2006.01)
(Continued)

(52) U.S. Cl.
CPC ........... *F25B 27/002* (2013.01); *F04C 18/3442* (2013.01); *F04C 23/001* (2013.01); *F24D 3/18* (2013.01); *F24D 11/0221* (2013.01); *F24D 11/0235* (2013.01); *F24F 5/0021* (2013.01); *F24F 5/0046* (2013.01); *F24H 7/04* (2013.01); *F24J 2/42* (2013.01); *F25B 27/005* (2013.01); *F25B 41/04* (2013.01); F04C 23/02 (2013.01); F04C 2210/26 (2013.01); F24D 2200/11 (2013.01); F24D 2200/31 (2013.01); F24F 2005/0064 (2013.01); F24J 2/14 (2013.01); F25B 2400/141 (2013.01); F28B 1/02 (2013.01); F28B 1/06 (2013.01); F28D 3/02 (2013.01); Y02B 10/20 (2013.01); Y02B 10/24 (2013.01);Y02B 10/40 (2013.01); Y02B 10/70 (2013.01); Y02B 30/126 (2013.01); Y02B 30/52 (2013.01); Y02E 10/40 (2013.01); Y02E 60/147 (2013.01); Y02E 70/30 (2013.01)

(58) Field of Classification Search
CPC .... F04C 23/001; F04C 23/02; F04C 2210/26; F24H 7/04; F24D 3/18; F24D 11/0235; F24D 11/0221; F24D 2200/11; F24D 2200/31; F24B 41/04; F24B 27/002; F24J 2/42; F24J 2/14; F24F 5/0046; F24F 2005/11; Y02E 60/147; Y02B 30/12; Y02B 10/24; Y02B 10/20
USPC ................................ 62/235.1, 260, 236, 515
See application file for complete search history.

(56) References Cited

U.S. PATENT DOCUMENTS 4,008,709 A * 2/1977 Jardine ............... F28D 20/0043
126/400
4,111,259 A * 9/1978 Lebduska ........... F24D 11/0221
126/613

(Continued)

*Primary Examiner* — Mohammad M Ali
(74) *Attorney, Agent, or Firm* — Scott D. Smiley; Mark C. Johnson; The Concept Law Group, P.A.

(57) ABSTRACT

The invention utilizes concentrated solar energy in a novel air conditioning system which includes storage capabilities. The refrigerant circuit "high" pressure side is comprised of multiple solar concentrators placed between two positive rotary valves. The "low" pressure side is compromised of the evaporator coil with expansion valve. The refrigerant is confined between the two rotary valves. As solar energy is absorbed into the refrigerant, the pressure and temperature rise. The two rotary valves are then caused to rotate. With rotation, the refrigerant is moved through the circuit. The circuit also includes a condenser to give up heat and an evaporator/expansion valve in which temperature drops with the expanding gas. In addition, this system places the evaporator in a water tank. The water is made cold by conduction with the evaporator and serves as a storage medium. All energy absorbed is converted to cold and stored and utilized as required.

14 Claims, 14 Drawing Sheets

(51) Int. Cl.
*F04C 18/344* (2006.01)
*F24H 7/04* (2006.01)
*F24D 3/18* (2006.01)
*F25B 41/04* (2006.01)
*F24F 5/00* (2006.01)
*F24D 11/02* (2006.01)
*F24J 2/42* (2006.01)
*F24J 2/14* (2006.01)
*F28B 1/02* (2006.01)
*F28B 1/06* (2006.01)
*F04C 23/02* (2006.01)
*F28D 3/02* (2006.01)

(56) References Cited

U.S. PATENT DOCUMENTS

| | | | | | |
|---|---|---|---|---|---|
| 4,173,994 | A | * | 11/1979 | Hiser | F25B 1/08 126/609 |
| 4,222,244 | A | * | 9/1980 | Meckler | B01D 53/26 62/235.1 |
| 4,265,219 | A | * | 5/1981 | Thomason | F24F 5/0046 126/585 |
| 4,448,039 | A | * | 5/1984 | Hutchins | F24J 2/32 62/235.1 |
| 4,646,539 | A | * | 3/1987 | Taylor | F25B 47/022 62/196.4 |
| 4,738,305 | A | * | 4/1988 | Bacchus | F24D 17/02 126/629 |
| 5,678,626 | A | * | 10/1997 | Gilles | F24F 5/0017 165/62 |
| 6,923,012 | B2 | * | 8/2005 | Kurata | B60H 1/00735 165/203 |
| 2004/0035141 | A1 | * | 2/2004 | Schmidt | F24D 11/00 62/434 |
| 2005/0101433 | A1 | * | 5/2005 | Joe | B60K 6/445 477/5 |
| 2014/0026606 | A1 | * | 1/2014 | Muscatell | F04C 18/3442 62/235.1 |

* cited by examiner

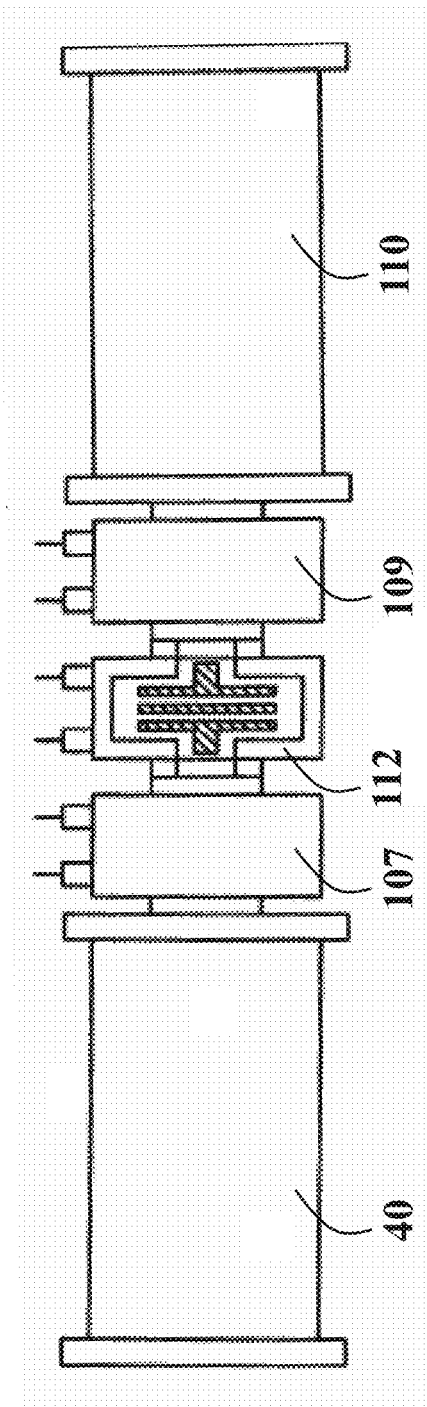
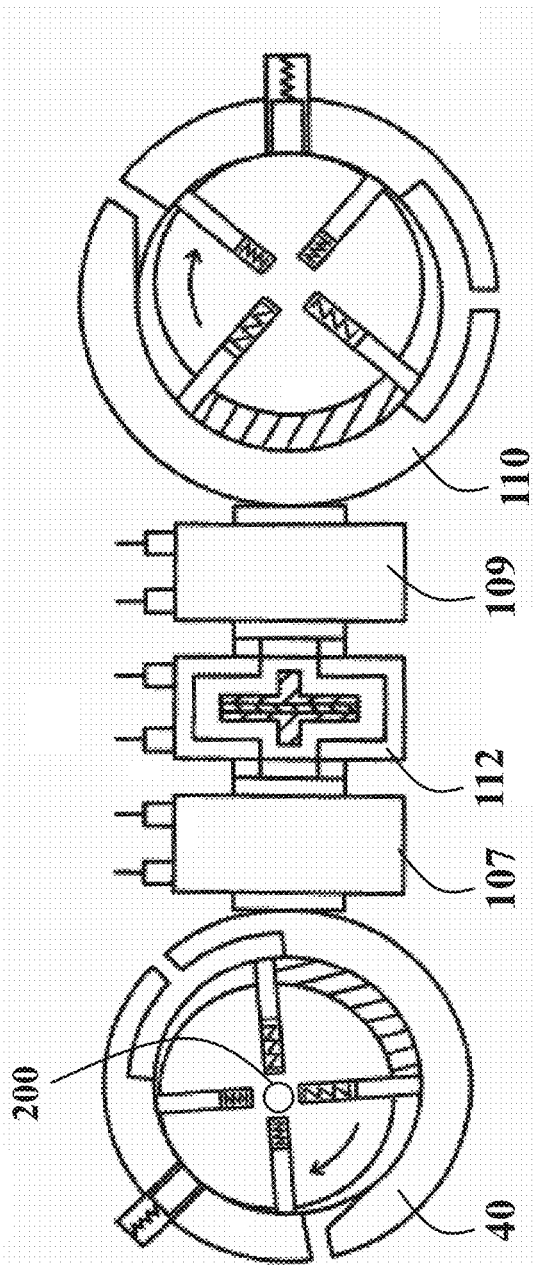

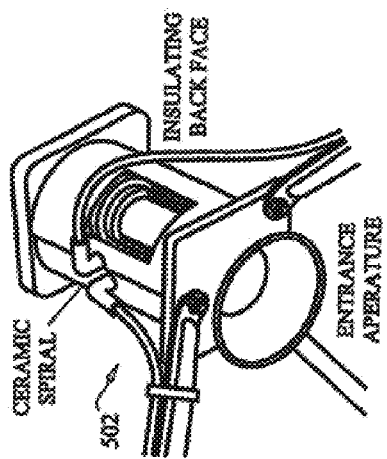
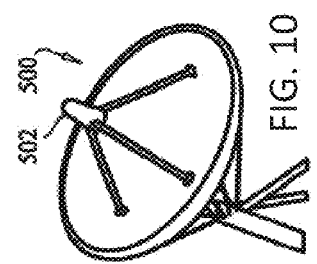
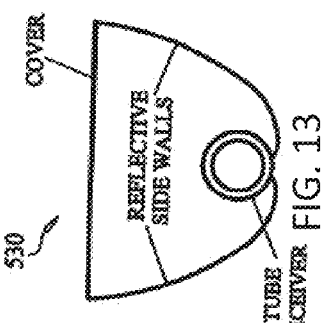
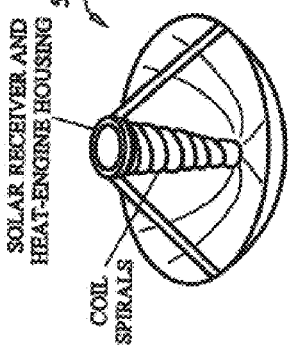
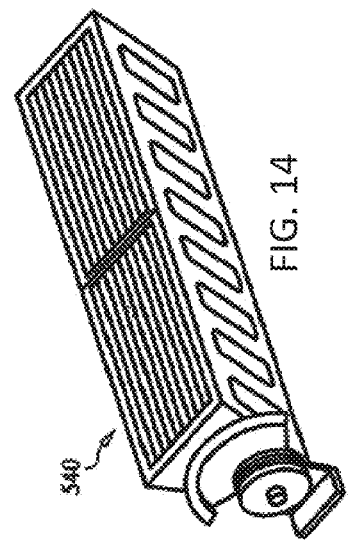
FIG. 10
FIG. 11
FIG. 12
FIG. 13
FIG. 14

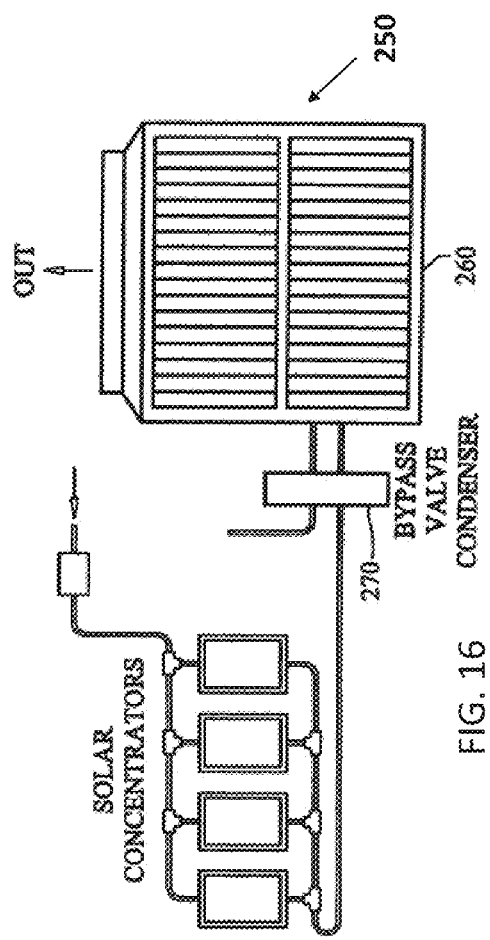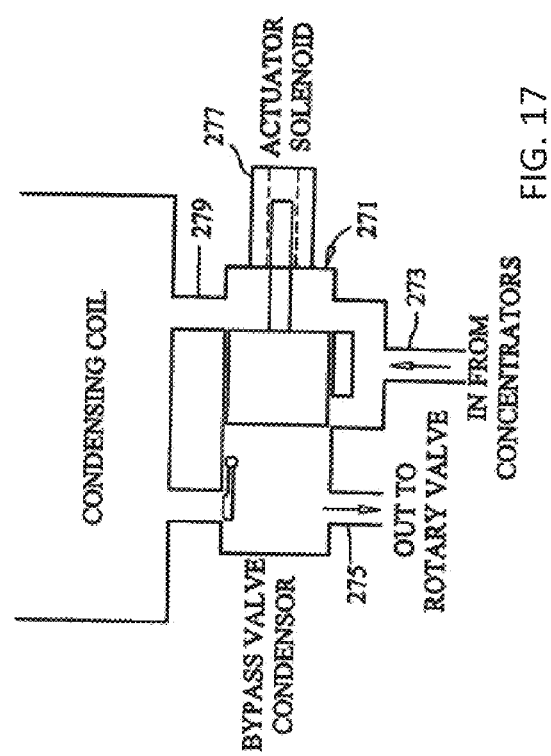
FIG. 16
FIG. 17

SOLAR ENERGY AIR CONDITIONING SYSTEM WITH STORAGE CAPABILITY

FIELD OF THE INVENTION

The present invention relates generally to air conditioning systems and particularly to a solar energy air conditioning systems having storage capability.

BACKGROUND OF THE INVENTION

High electricity bills from air conditioning and/or heating use for a dwelling are common and reoccurring. Additionally, the manufacture of energy at a power plant causes pollution to be released in the air. Furthermore, electricity availability in undeveloped countries, as well as remote locations in developed countries, may be scarce, on limited basis or often non-existent. As a result, these locations are unable to store foods and liquids requiring refrigeration due to the lack of electricity. For undeveloped countries the lack of electricity is a factor in the poverty, hunger and lack of nourishment for its citizens. It is to these problems that the present invention is directed.

SUMMARY OF THE INVENTION

The present invention generally provides a solar air-conditioning system that is preferably designed to operate with concentrated solar heat supplemented with solar electric cells/battery and if necessary, power from an electric utility grid. The unit of heat added or subtracted is a British Thermal Unit ("BTU"), which is defined as the amount of heat to raise one pound of water one (1°) degree Fahrenheit. With excess capacity preferably designed in, unused BTUs can be stored for night and cloudy days. The present invention system can use a circulating refrigerant such as, but not limited to, Freon or ammonia in a cycle of compression and expansion. Solar concentrators can raise temperature and pressure of the refrigerant. The raised temperature can be dissipated to the atmosphere via the condenser coil and the refrigerant then proceeds to the evaporator coil. The evaporator can be located within a water tank containing an anti-freeze water solution. Water is the storage medium. Preferably, the water tank contains at least approximately 2000 gallons of the anti-freeze water or water solution. Heat can be added to or extracted from the storage medium by the evaporator coil.

Preferably, also within the water tank can be a radiator type pickup coil. The pickup coil can be part of a separate chilled water system which can circulate its own water supply through radiators located throughout a building, dwelling, house, etc. (all collectively referred to as "dwelling"). The temperature within this separate system can be the temperature of the water within the tank by simple conduction.

The refrigerant system can include a supplemental compressor which can be electrically driven from one or more, and preferably a plurality or bank of, solar electric cells or the power grid. The refrigerant system can also include one way direction positive displacement rotary valves which can serve to insure refrigerant pressures and temperatures are optimized throughout the circuit as the solar energy varies. The system may be operable in various modes. For example, when in "solar heat mode," certain bypass valves within the refrigerant system allow switching to solar heating. In said mode, solar energy is utilized to add heat to the storage medium. Solar energy can also be said to be the primary driving force behind activation and operation of the air conditioning system in certain embodiments. In said mode or other modes, motors may also be used to facilitate the circulation of the refrigerant.

The present invention can also be used for or applicable to large area coolers or refrigerators and provides a device which can provide refrigeration to areas where electricity is not present or available.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

FIG. 4 is a close-up side view of a clutch and motor assembly coupled with the valves as shown in FIG. 2;

FIG. 5 is a close-up schematic of the clutch, motors, and a rotary valve assembly shown in FIG. 4;

FIGS. 10-14 illustrate alternative concentrators and components thereof that can be used with the present invention;

FIG. 16 is partial schematic/flow diagram of a portion for the solar air-conditioning and/or heating circuit showing a bypass valve and the condenser coil;

FIG. 17 is a detailed view of one bypass valve, used when switching to solar heat mode, in accordance with another embodiment of the present invention;

DETAILED DESCRIPTION

Figure 1:
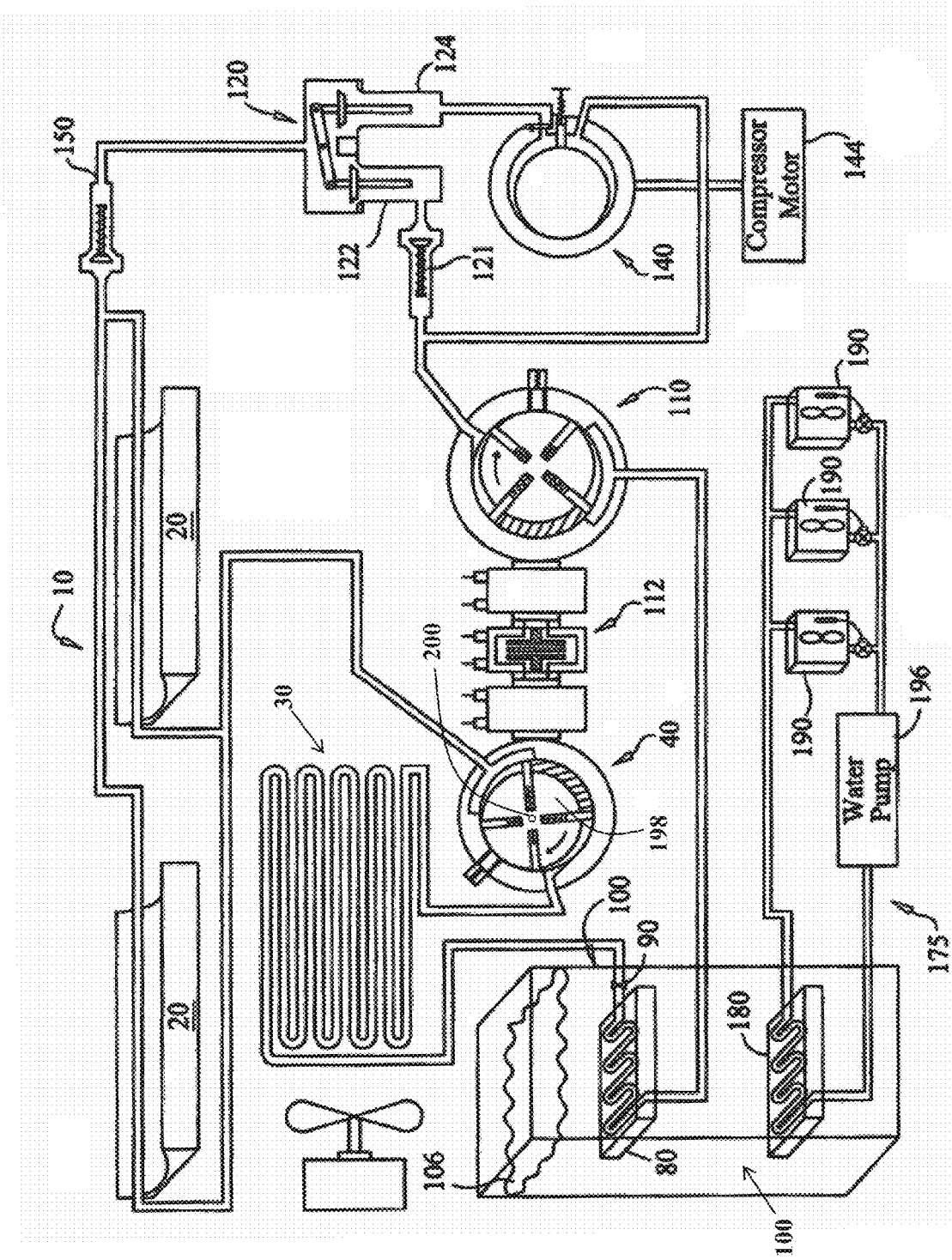
FIG. 1 is a schematic/flow diagram of a solar air-conditioning and/or heating circuit system in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
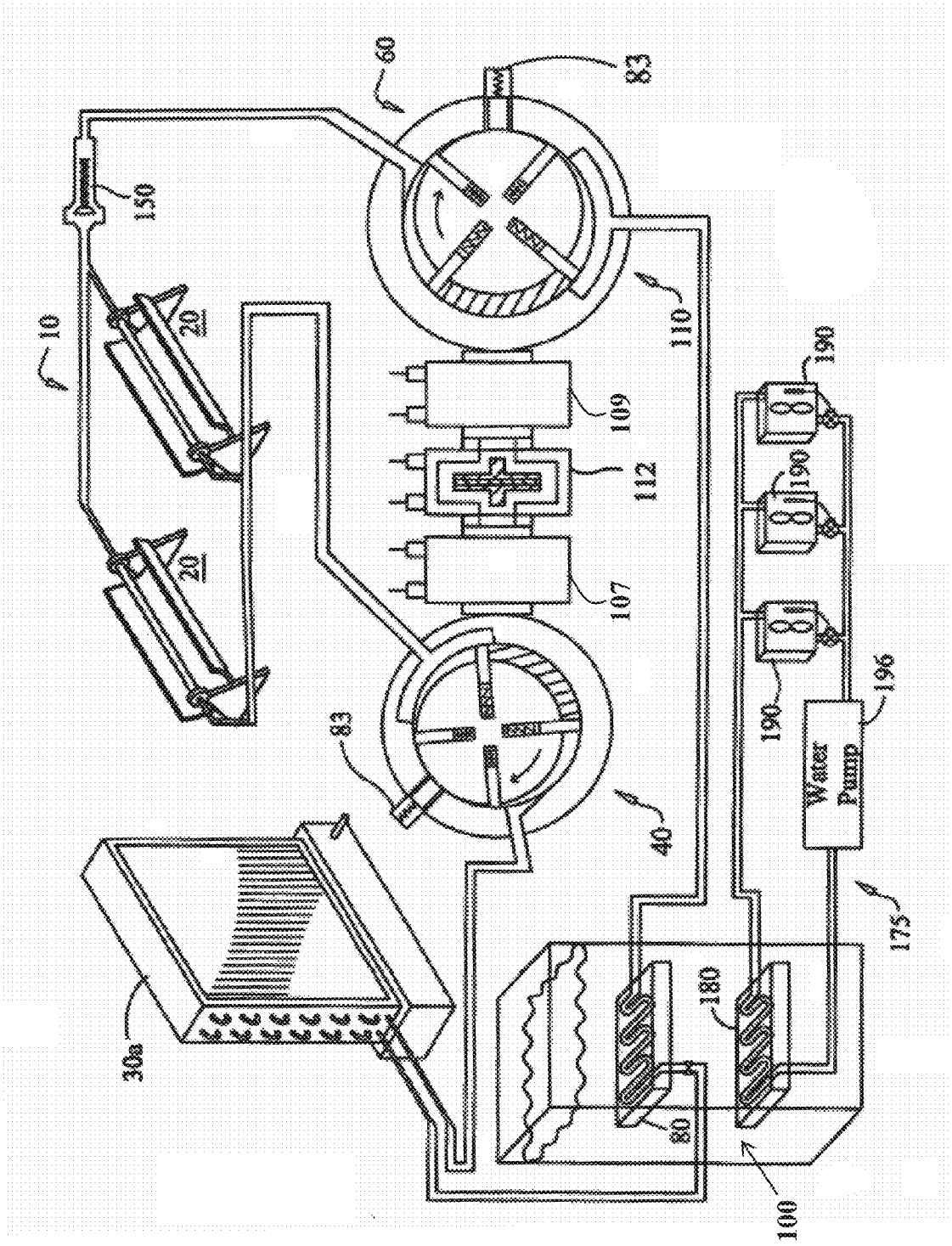
FIGS. 2 and 3 illustrate alternatives schematic/flow diagrams for the embodiments of the present invention, with FIG. 2 showing a schematic diagram of a plurality of rotary valves in a circuit and FIG. 3 showing a non-limiting representation of actual rotary valves in a circuit.
Figure 3:
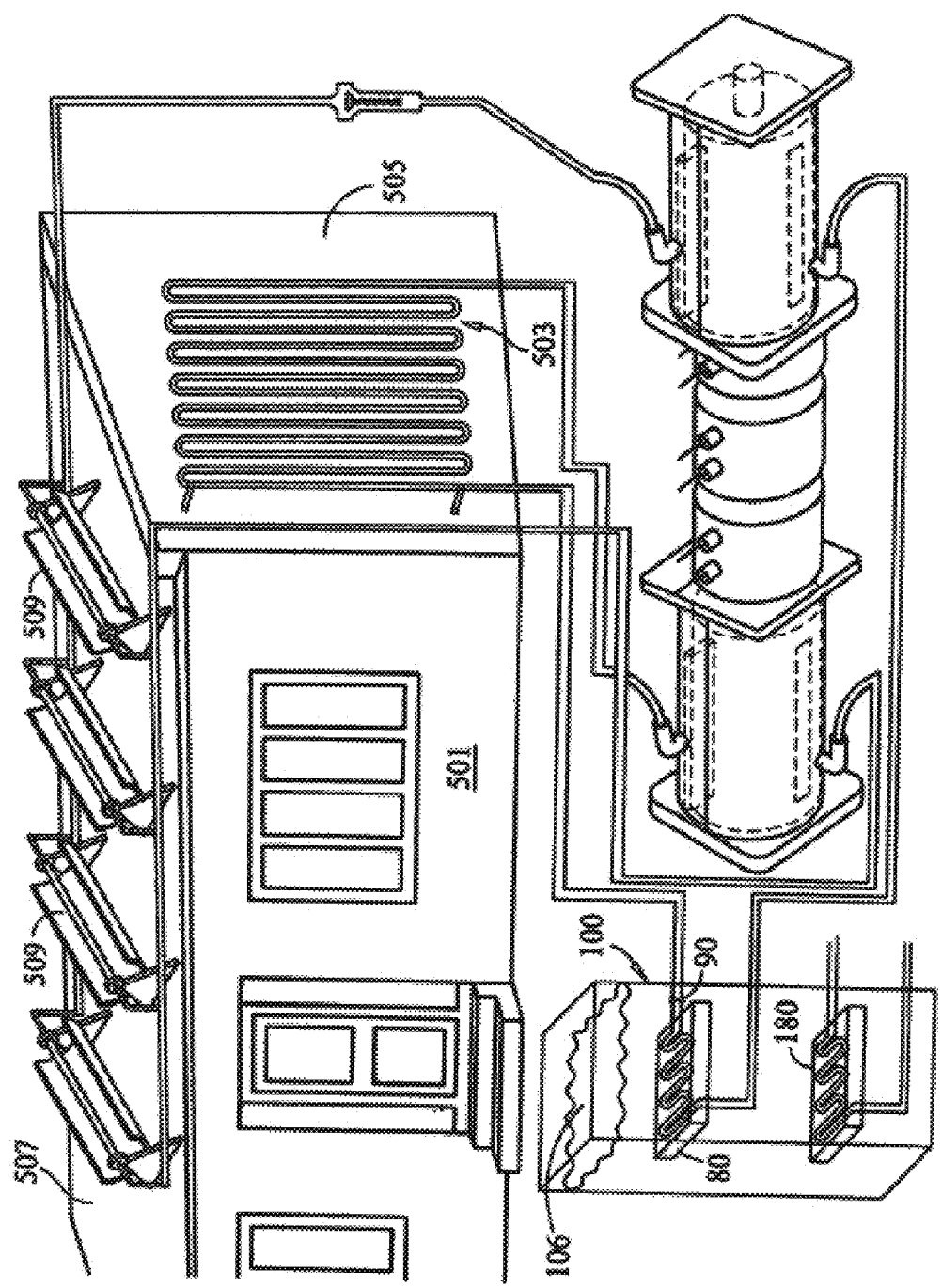

The present invention provides a novel and efficient solar air-conditioning system, generally referenced as system 10, which can be best seen in FIGS. 2 and 3. In one exemplary embodiment, the system 10 includes one or more solar concentrators 20, 509 preferably a plurality of concentrators 20, arranged in a parallel configuration or in communication with each other. The concentrator(s) 20 capture energy from the sun raising the temperature and pressure of the refrigerant within the pipe, tubing, plumbing, conduits, hoses, etc. (all collectively referred to as "pipe" or "piping") at the focal point. Though not considered limiting, the refrigerant can be Freon or ammonia gas. All of the piping, valves, components, etc. of the present invention are preferably connected to each other through conventional connectors, fasteners, etc. As will be described in more detail below, the concentrators 20 provide the structure utilized to exchange heat from the sun to the refrigerant in the lines, which is in turn used to initiate the thermodynamic cycle depicted in FIGS. 1-3.

The refrigerant within the pipe proceeds or otherwise travels to a rotary valve 40 and then to one or more heat dissipaters, commonly known as a condenser 30. The condenser 30 can be a large area condenser. Condensers 30 dissipate heat from the refrigerant to the ambient atmosphere. In an alternative embodiment, condenser 30 can be a single stand-alone unit, which can include an electrically driven fan similar to conventional condensers. Thus, FIG. 1 illustrates a single condenser coil 30 (also shown in the schematic of FIG. 16 as 260).

Below summarizes the function or operation of one embodiment of the present invention. The process of the system starts with zero energy (heating) and the refrigerant under minimal pressure throughout the circuit. This might be night or prolonged cloudy conditions. In these conditions there is no circulation of the refrigerant. Focusing now on the portion of the circuit between the valves 40, 110, which includes the solar concentrators 20 (also shown in FIG. 2). As solar energy becomes available to the concentrators, the refrigerant in this part of the circuit absorbs heat and the heated refrigerant increases in pressure. The refrigerant is confined between the valves 40, 110 and cannot circulate. The refrigerant continues to gain energy. At a predetermined temperature, pressure of the refrigerant is detected by sensors and an electric current is supplied to motors coupled to the valves 40, 110. With resulting simultaneous rotation of the two valves 40, 110, the refrigerant is caused to move through the circuit. The refrigerant moves into the condenser 30a to give up heat and then to the expansion valve in the evaporator where the pressure is dropped, further absorbing heat (made cold). This temperature is conveyed to the energy storage medium, e.g., water or other fluid, in the tank 100, e.g., an energy storage apparatus. It can be anticipated that the pressure in this portion of circuit, i.e., between the valves 40, 110, is acting on the vane at the input of the valve 40 and is contributing to the electro motive force to cause valve rotation, or circulation of the refrigerant. This is an important distinction differentiating the present invention from the prior art.

As can be seen in FIG. 2, refrigerant is advanced from rotary valve 40 into a condenser 30a where heat from the refrigerant is given up to the ambient environment. The refrigerant proceeds to the evaporator 80 which is disposed in the storage medium, e.g., fluid such as water. As the evaporator 80 is fitted with commonly known expansion valve, the refrigerant passes into the evaporator 80 where the pressure reduces with consequent temperature reduction. The evaporator is then at a temperature lower than the liquid in the tank 100, thereby lowering the temperature of the storage medium through conduction. The refrigerant then flows to the second rotary valve 110 (also called the "low side" of the circuit), which may be (along with the first valve 40) substituted with a compressor in alternative embodiments. The refrigerant then proceeds to solar concentrators to again absorb solar energy (also called the "high side" of the circuit). As described in more detail below, the valves 40, 110 function so as to rotate simultaneously to circulate the refrigerant and/or may be fitted with clutches, motors, and other components to rotate independently of one another. This advantageously produces a more efficient and effective system utilizing solar energy.

Figure 18:
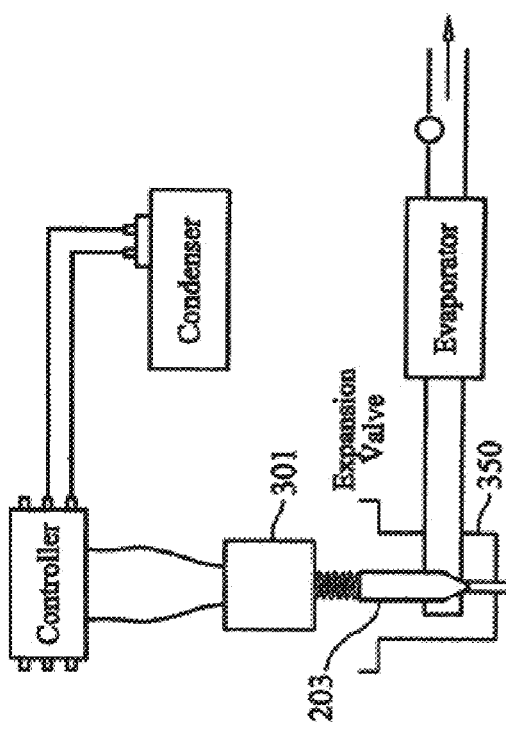
FIG. 18 is a partial schematic of an exemplary expansion valve used with the circuit of FIGS. 2-3 in accordance with an embodiment of the present invention.

Again, from the valve 40, the refrigerant travels to a condenser 30 and then to an evaporator 80 which is preferably fitted with an expansion valve 90. In the preferred embodiment, the expansion valve 90 can be an electronically controlled valve to function with the varying solar energy being supplied into the system, though such is not considered limiting. FIG. 18 further depicts a close-up view of an exemplary expansion valve used in accordance with one embodiment of the present invention.

The valve 90 is controlled based on the pressures contained within the refrigerant circuit which can vary as the solar energy varies. The expanding refrigerant within evaporator 80 removes the heat from the coil and medium surrounding evaporator 80. Preferably, evaporator 80 can be disposed within a water tank 100. The water tank 100 is preferably large enough in size to hold a large amount of a liquid, such as, but not limited to, approximately two thousand (2000) gallons of the liquid. However, other sized water tanks can be used and are considered within the scope of the invention.

Preferably, the liquid 106 contained within water tank 100 can be a mixture of water and anti-freeze. Preferably, the water tank 100 can be insulated, such as, but not limited to, burying water tank 100 beneath ground level. Additionally, the water tank 100 can be greater in height than width to operate co-operatively with temperature stratification. As such, heat can be removed from many gallons of water, which a non-limiting example is shown by the following factoid using a non-limiting 2000 gallon water tank 100:

British Thermal Unit ("BTU"). 1 BTU=1 pound of water 1° F.

Water=8 pounds per gallon; 1 cubic foot=7.48 gallons=60 pounds of water.

Non-limiting Tank 100 dimensions: 5 ft×5 ft×10.8 ft=270 cu. ft~2000 gallons.

2000 gallons=16,000 pounds=16,000 BTU per degree Fahrenheit.

32° F. to 12° F.=20° F.

20° F.×16,000 BTU=320,000 BTU.

320,000 BTU/20,000 BTU hour=16 hours reserve.

SOLAR POWER: Solar Concentrator area/square ft.

200 BTU/square foot/hour around solar noon.

20,000 BTU's per 100 square feet.

40,000 BTU's per 200 square feet.

Non-limiting Solar Concentrator 20 dimensions: each 2 ft.×10 ft.=20 square ft.

10 units=200 square ft=40,000 BTU/hour.

With reference to FIGS. 1 and 2, the refrigerant exits from evaporator 80 and is directed to a second valve 110, which again can be a positive displacement one-direction rotary valve. In other embodiments, the valve 110 may be another type of valve or a compressor. In one embodiment, the valve 110 can have a larger positive displacement chamber when compared to valve 40, since it may be working with lower pressures, and thus in the preferred embodiment, can be considered a low pressure valve. The valve 110 can also have a mechanical link and can be (though not required) mechanically linked with valve 40, as illustrated in FIGS. 1-3. By linking valves 40 and 110 together, stability can be provided to the refrigerant circuit. In other embodiments, the valve 110 can also be unlinked from the valve 40 by use of one or more clutches 112. In one embodiment, the clutch may be a friction clutch. In other embodiments, the clutch is a hydraulic clutch, an electromagnetic clutch, or any other device that provides for the transmission of rotary power from one component to another. The clutch provides the means for versatile control of pressures throughout the refrigerant cycle.

Figure 21:
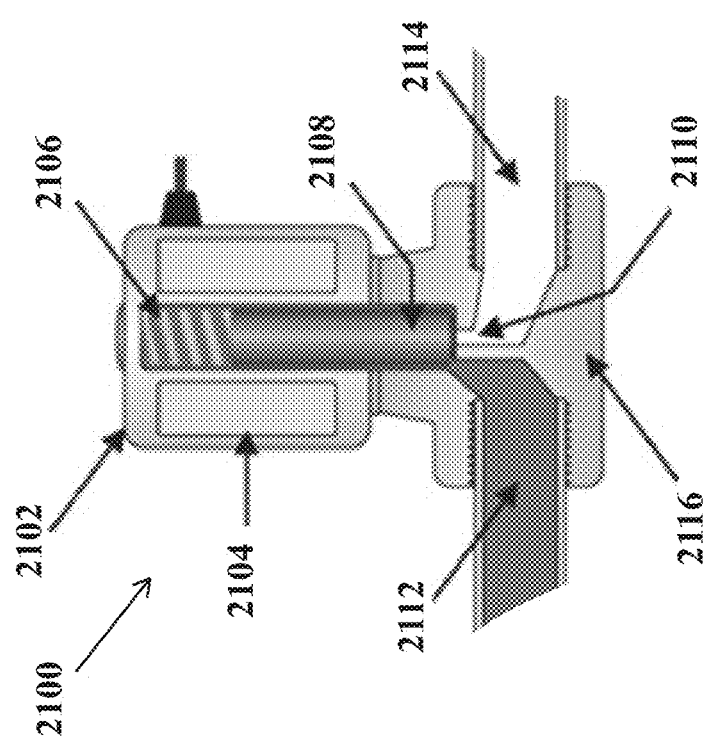
FIG. 21 illustrates an exemplary solenoid valve utilized in the refrigerant circuit, in accordance with an embodiment of the present invention.

Further, in one embodiment the valves 40, 110 may utilize a drum 198 that is operably rotated centrally about an axle 200. Said another way, the drum 198 is centered within the housing and rotated about said axle 200. In other embodiments, the drum 198 is operably rotated about an off-centered axis. In further embodiments, the drum 198 may be operably rotated in an eccentric path. In additional embodiments, the valves 40, 110 may utilize one or more solenoid, such that they would be said to be of a solenoid valve(s). An exemplary solenoid valve 2100 is depicted in FIG. 21. The solenoid valve 2100 may include a solenoid 2102, a flow control means, and other components typically utilized in conjunction with a solenoid valve, e.g., a coil 2104, a spring 2106, a plunger 2108, a seat 2110, an inlet 2112, an outlet 2114, and a valve body 2116.

A great variety of valve types may be employed in the circuit instead of valves 40, 110. In yet another embodiment, solenoids valves 2100 (as shown in FIG. 21) are employed in the circuit. In such a configuration, a first solenoid valve would be used for valve 40 and a second solenoid valve would be used for valve 110. In operation, both solenoid valves are closed and the refrigerant is confined and not moving in the circuit. The refrigerant gains solar energy. At a predetermined level of temperature and pressure, the solenoid valves are energized and caused to open. At this point the refrigerant is caused to advance into the circuit—to the condenser and evaporator—by simple equalization. Movement is confined to the high side—condenser and evaporator—by one way valve 150. After this energy is expended, pressure throughout the circuit is equalized and the valves are again energized to a closed position and accumulation of solar energy repeats.

Figure 23:
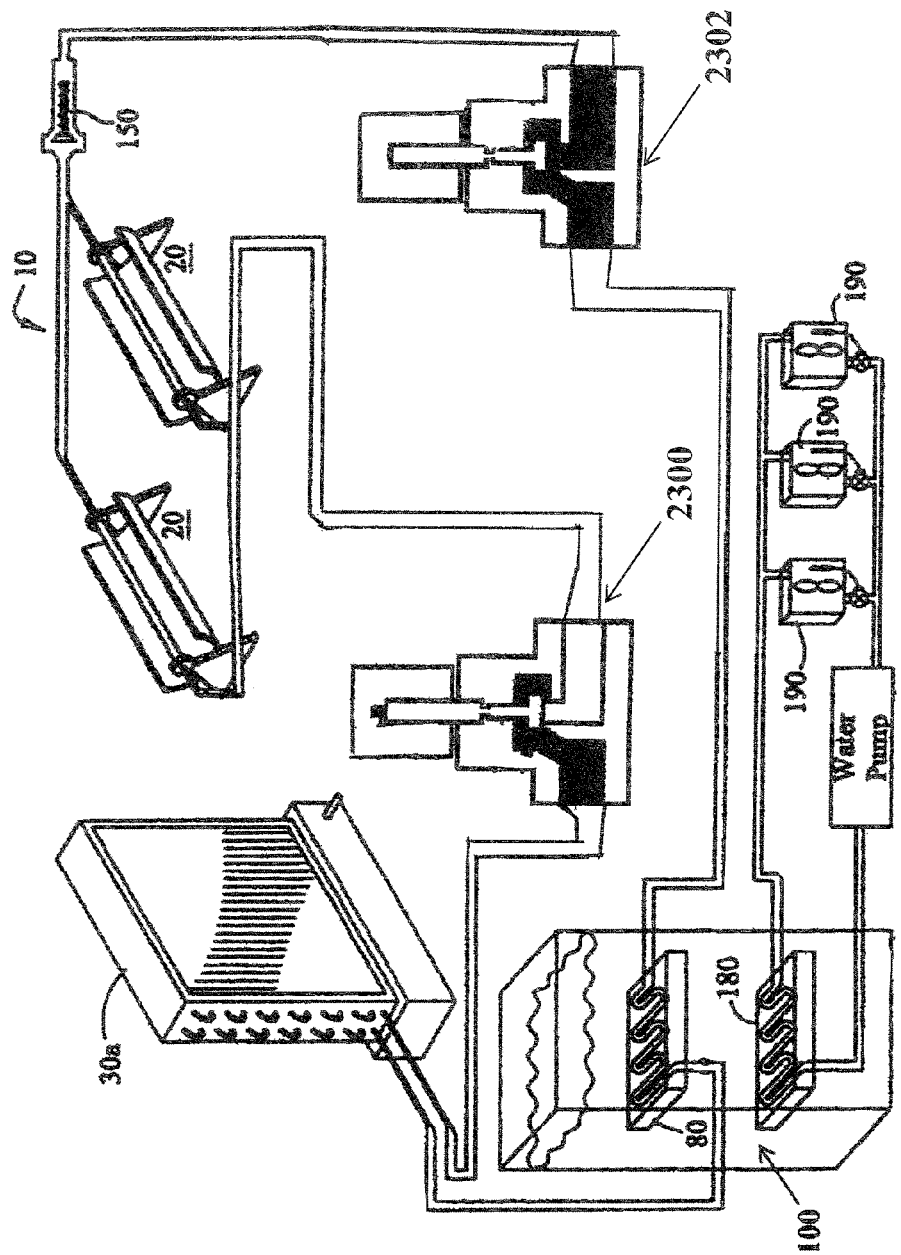
FIG. 23 illustrates a schematic/flow diagram of a solar air-conditioning and/or heating circuit utilizing solenoid valves, in accordance with an embodiment of the present invention.

With brief reference to FIG. 23, a schematic/flow diagram of a solar air-conditioning and/or heating circuit utilizing a first and second solenoid valve 2300, 2302 in place of the rotary valves can be seen. Similar to the rotary valves 40, 110, the solenoid valves include an inlet and outlet where refrigerant may pass through. As shown in FIG. 23, the first solenoid valve 2300 is closed, preventing the refrigerant from passing from the high side of the circuit to the low side of the circuit. The second solenoid valve 2302 is depicted in the open position such that the refrigerant can flow through the solenoid valve 2302. In operation, both solenoid valves 2300, 2302 are closed and the refrigerant is confined and not moving in the circuit. The refrigerant gains solar energy. At a predetermined level of temperature and pressure, the solenoid valves 2300, 2302 are energized and caused to open. At this point the refrigerant is caused to advance into the circuit—to the condenser and evaporator—by simple equalization. Movement is confined to the high side—condenser and evaporator—by one way valve 150. After this energy is expended, pressure throughout the circuit is equalized and the valves 2300, 2302 are again energized to a closed position and accumulation of solar energy repeats. Said solenoid valves 2300, 2302 may be controlled independent of one another—such as the refrigerant circuit utilizing a compressor shown in FIG. 1—or may operate, e.g., open and close, simultaneously to promote adequate flow of the refrigerant through the circuit. All other elements/components used in the circuit are similar those shown in FIGS. 1-3.

A close-up view of an exemplary motor/clutch assembly is shown in FIGS. 4 and 5. More specifically, the valves 40, 110 may include a clutch 112 that facilitates power transfer from the motors 107, 109 to the valves 40, 110. Each of these components may be electronically controlled, as shown in more detail in the schematic of FIG. 19. With brief reference to FIG. 19, the controller 1900 may work in combination with one or more pressure sensors 1902.

Figure 6:
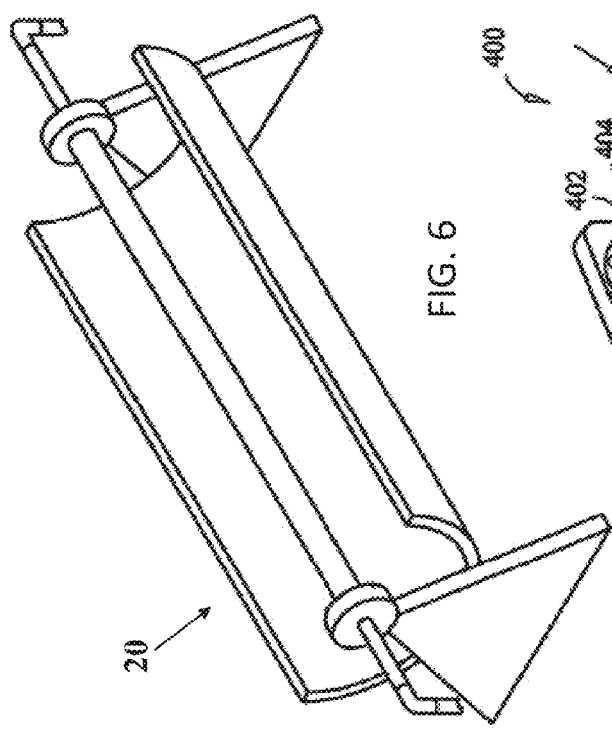
FIG. 6 is a perspective view of a solar concentrator which can be used with the present invention.

Again, as summarize above and with reference to FIG. 1, the refrigerant then is directed from valve 110 to a preferably commonly connected balancing valve 120 and/or as an inlet to compressor 140. The system balancing valve 120 can have a first inlet valve 122 which can constitute the primary circuit for the refrigerant and a second inlet valve 124 which is in communication with the outlet of compressor 140. The refrigerant travels through balancing valve 120 to one direction or one-way valve 150 where it proceeds to solar concentrator(s) 20 to restart the cycle. A close-up perspective view of a solar concentrator which can be used with the present invention system is shown in FIG. 6.

The compressor 140 can be driven by a conventional compressor motor 144. Thus, when there is insufficient solar energy (cloudy day, etc.), system 10 (such as through one or more sensors provided in the circuit) can sense or otherwise determine to activate motor 144 to electrically drive compressor 140. At such times when the compressor 144 is activated, an electrical current may also be supplied to motors 107, 109 to assist refrigerant circulation. In one non-limiting example, a temperature sensor can be disposed within the water tank for determining when to turn motor 144 on. Additionally, pressure sensors or other devices can also be used for this purpose. Pressurized refrigerant from compressor 140 can proceed through second inlet valve 124 on the balancing valve to one direction valve 150. Where a temperature sensor is provided within water tank 100, compressor 140 can be activated at predetermine temperatures through its connection to a conventional switcher (not shown in FIG. 1). In one non-limiting example, the predetermined temperature can be anywhere in the range of about 32° F. to about 12° F. However, other temperature values can be used and are considered within the scope of the invention.

The present invention can store air conditioning energy in the form of chilled water, which can be below the freezing point of 32° F., and preferably within the temperature range of about 32° F. to about 12° F. However, the present invention is not limited to this specific range and other ranges can be chosen and are within the scope of the invention.

Balancing valve 120 can be constructed such that there is linkage between first inlet valve 122 and second inlet valve 124. Thus, first inlet valve 122 can be closed, when the force of the pressurized refrigerant from compressor 140 opens second inlet valve 124. Similarly, when first inlet valve 122 is opened through receipt of refrigerant from valve 110, second inlet valve 124 can be closed. It is also possible and within the scope of the invention that both first inlet valve 122 and second inlet valve 124 are partially opened at the same time and the refrigerant traveling through both inlet valves (122 and 124) merges or combines and enters a single outlet which serves as the inlet to one way valve 150.

As seen in FIG. 2, the water tank 100 also contains a pickup radiator 180 acting as heat exchange coil which functions as part of a separate chilled (or heated) water system 175 of air-conditioning (heat) for withdrawing (or adding) heat from (or to) a dwelling or structure through one or more radiators 190. Pickup radiator 180 in water tank 100 and one more radiators 190 disposed throughout the dwelling can circulate anti-freeze/water by way of a pump 196, which can be electrically or mechanically driven. The circulation of the water allows heat to be removed from or added to (as desired) from the dwelling. The chilled (heated) liquid or water system in the preferred embodiment is separate and isolated from the storage medium liquid or water. One skilled in the art would include a control, such as a thermostatic control, at each dwelling coil controlling the cold water flow such that the freezing point is not attained in these coils.

The present invention system can also be converted or otherwise switch from solar air conditioner to solar heating. As seen in the fragmentary view of FIG. 16, the system 250, which can contain similar not shown components as system 10, where a stand-alone (single) condenser 260 is used with a bypass valve 270 (with associated piping). By opening or otherwise engaging bypass valve 270 and electrically withdrawing the controlling element of the electronic expansion valve 90, the solar heated refrigerant is allowed to circulate through evaporator 80, which heats the water or mixture in water tank 100 by conduction. The motors can drive rotary valves 40 and/or 110 to assure circulation of the heated refrigerant through the refrigerant circuit.

Bypass valve 270 is shown in more detail in FIG. 17. A housing 271 with inlet port 273 and outlet port 275 is shown. Actuator solenoid 277 controlling a piston 279 dictates the travel route of the refrigerant by opening or closing appropriate ports depending if the system is being used for air conditioning or for heating purposes. However, other types of bypass valves can be used with the present invention system or circuit and are also considered within the scope of the invention.

As the heat of the refrigerant has not been dissipated through a condenser, the refrigerant warms water or mixture in tank 100, which in turn causes the liquid/water in pickup radiator 180 to be heated and then dispersed through system 175 by pump 196 as described above.

The present invention system can also be utilized in connection with solar electric panels and a battery. Electricity derived from this sub-system can drive the compressor that may replace the one or more valves 40, 110, or may drive the compressor along with one or more valves 40, 110. When the system utilizes concentrator(s) 20, the system may utilize both concentrators 20 and solar panels to complement one another and drive the refrigerant within the circuit. Additionally, at times of insufficient solar energy or battery energy, power from a utility grid can supply the energy to drive rotary valves and/or the compressor. A switching control can be provided for managing or controlling the various energy sources. Thus, the various sensors and components help to drive rotary valves and/or the compressor 140 when needed.

It should be recognized that various combinations of concentrator(s), battery(ies), utility grid (conventional electricity), solar panel(s), etc. can be used and all combinations are considered within the scope of the invention. Thus, as non-limiting examples, the complimentary system does not necessarily preclude (1) a system which operates solely on energy from solar concentrators, excluding solar electric; or (2) a system which operates solely on solar electric panels, excluding solar concentrators. Again, the above-described energy sources can be used in various combinations or by themselves and all variations are considered within the scope of the invention.

FIG. 18 depicts another embodiment of the expansion valve 350 component, also shown in the refrigeration circuit of FIG. 1 as the valve 90. The primary function of the expansion valve is to meter pressurized gas (high side) into the evaporator (low side) allowing expansion of the gas and corresponding heat absorption. Conventional expansion valves operate with a constant known pressure. However, with the present invention system it is preferred that the expansion valve operate over a range of pressures as solar energy will vary. Thus, different types of novel designs for the expansion valve can be used and incorporated into the present invention system where the expansion valve can be controlled according to pressures on the high side and on the low side within the refrigerant circuit.

Figure 19:
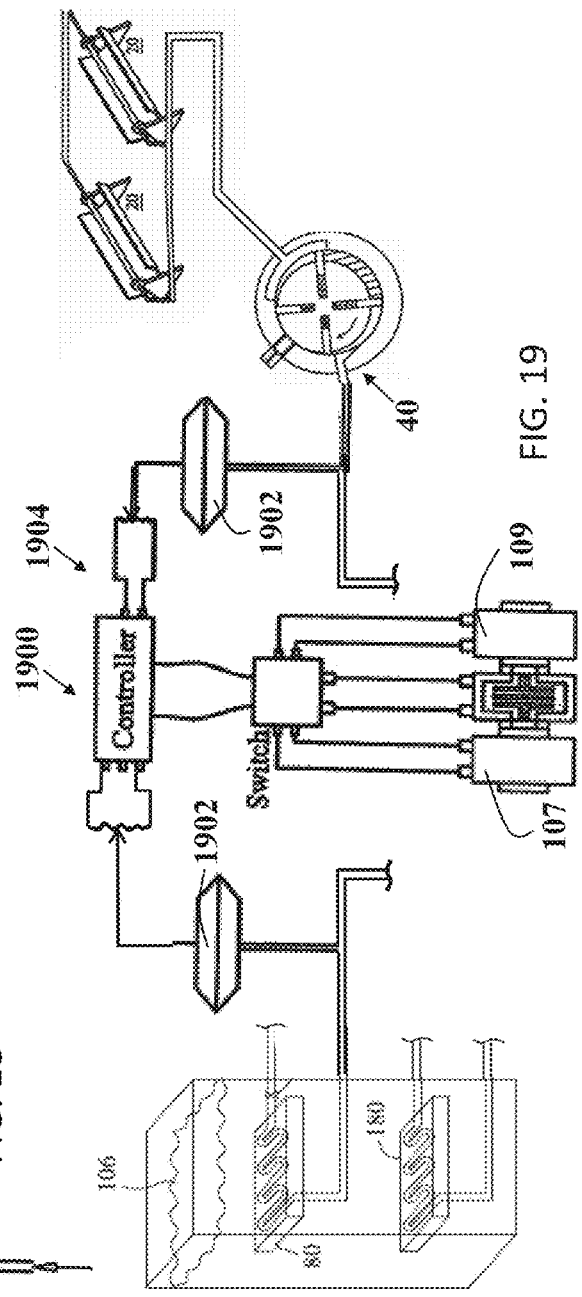
FIG. 19 is a partial schematic of an exemplary circuit of FIGS. 2-3 in accordance with an embodiment of the present invention.

With reference to FIGS. 18 and 19, the expansion valve 350 may control a control element 203 through the use of an electrically drive linear motor. Control of valve element 203 is again according to pressures within the refrigerant circuit and particularly on the high side before expansion valve 90 (shown in FIG. 19) and after the valve on exit from the evaporator 80. The expansion valve can be controlled by an electrical controller utilizing pressure sensors diagrammatically shown as diaphragm-type actuating potentiometers.

Though in the preferred embodiment the chilled water system can be an isolated closed system with a pickup coil in the water tank, such is not considered limiting. It is also within the scope of the invention to have the present invention operate with no pickup coil within the tank. Such an alternative version could operate circulating the storage medium water within the water through the in-dwelling radiators.

Figure 7:
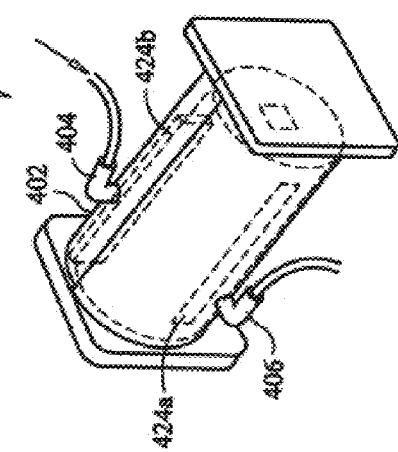
FIG. 7 is a perspective view of rotary valve that can be used with the present invention.
Figure 8:
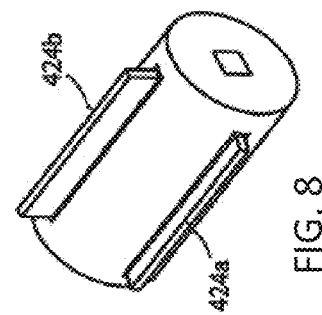
FIG. 8 is a perspective view of the inner cylinder for the rotary valve of FIG. 7.
Figure 9:
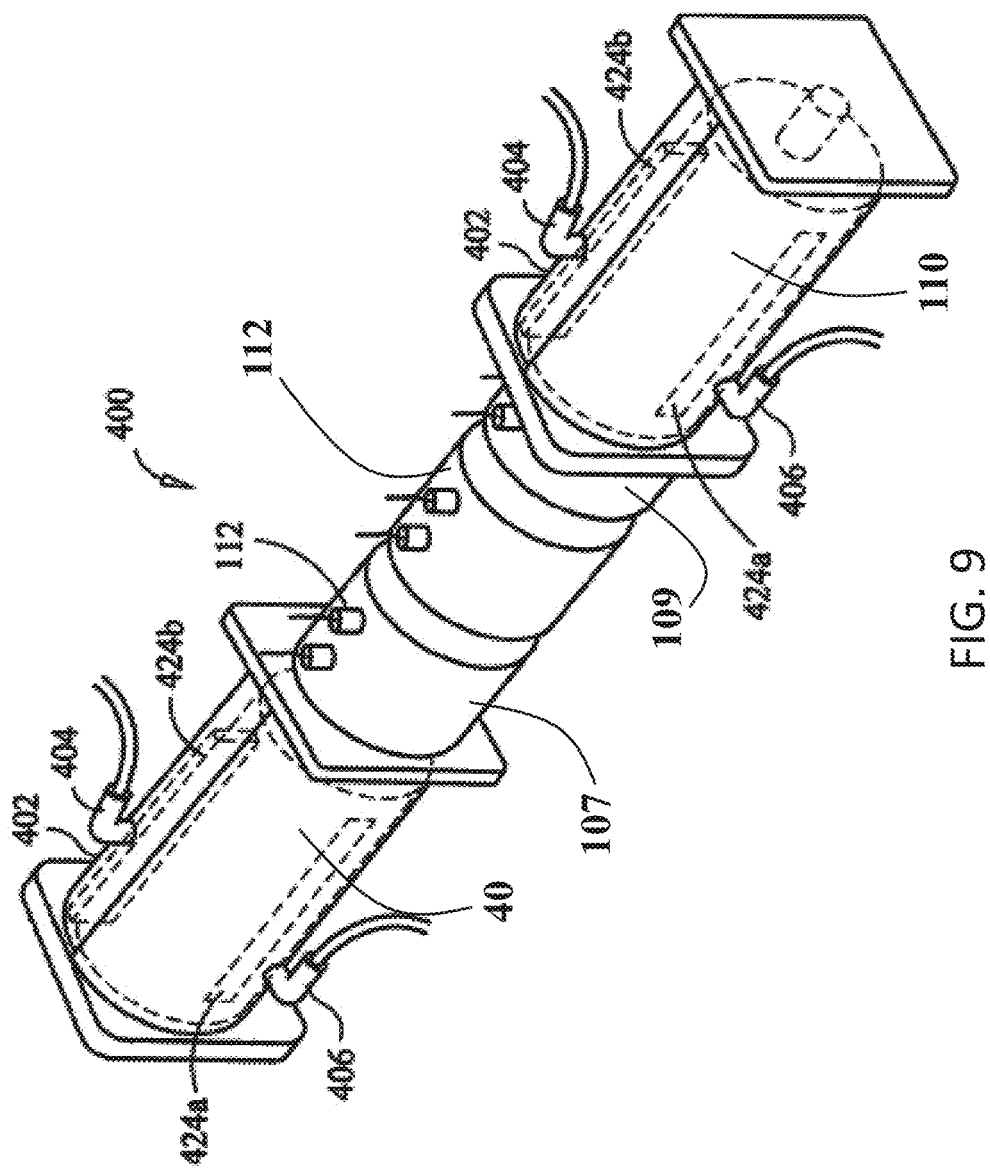
FIG. 9 illustrates an exemplary clutch in the center with an electric motor attached respectively at each end of the clutch and rotary valves attached respectively to each electrical motor.
Figure 22:
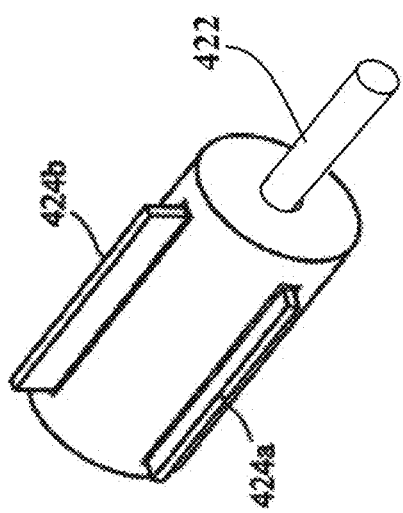
FIG. 22 illustrates an exemplary inner rotational cylinder used in connection with the rotary valve of FIG. 5, in accordance with an embodiment of the present invention.

FIGS. 7 and 8 illustrate a rotary valve 400 that can be used with the present invention system as such as valve 40 and/or valve 110 shown in FIGS. 1-5. The valve 400 comprises an outer cylindrical valve body housing 402 having an inlet port 404 and an outlet port 406. Preferably, outlet port 406 can be preferably about one-hundred eighty degrees (180°) in direction of rotation from inlet port 404 in a four (4) vane configuration and correspondingly so with multiple vanes. An inner rotational cylinder 420 is disposed within housing 402 and can be supported by a center longitudinal shaft 422 (shown in FIG. 22) offset from the center of outer housing 402. A plurality of vanes 424 (preferably spring loaded) are fitted into cylinder 420. The vanes 424 are disposed along the longitudinal axis of cylinder 420 and preferably equally spaced from each other around the circumference of cylinder 420. A portion of cylinder 420 is tangent to the inner wall of housing 402 such that vane 424a is fully compressed.

Fundamental to the "refrigeration" or "heat pump" cycle is a dissipation of the heat generated from compression (or concentrated solar energy). This is usually accomplished by circulating the compressed refrigerant gas through a finned coil exposed to the atmosphere (i.e., a condenser coil). It may be a large area condenser to dissipate heat by simple conduction (FIG. 3, numeral 503) or it may be smaller and compact (conventional) with fan forced air circulation (as shown in FIGS. 1-2).

Figure 15:
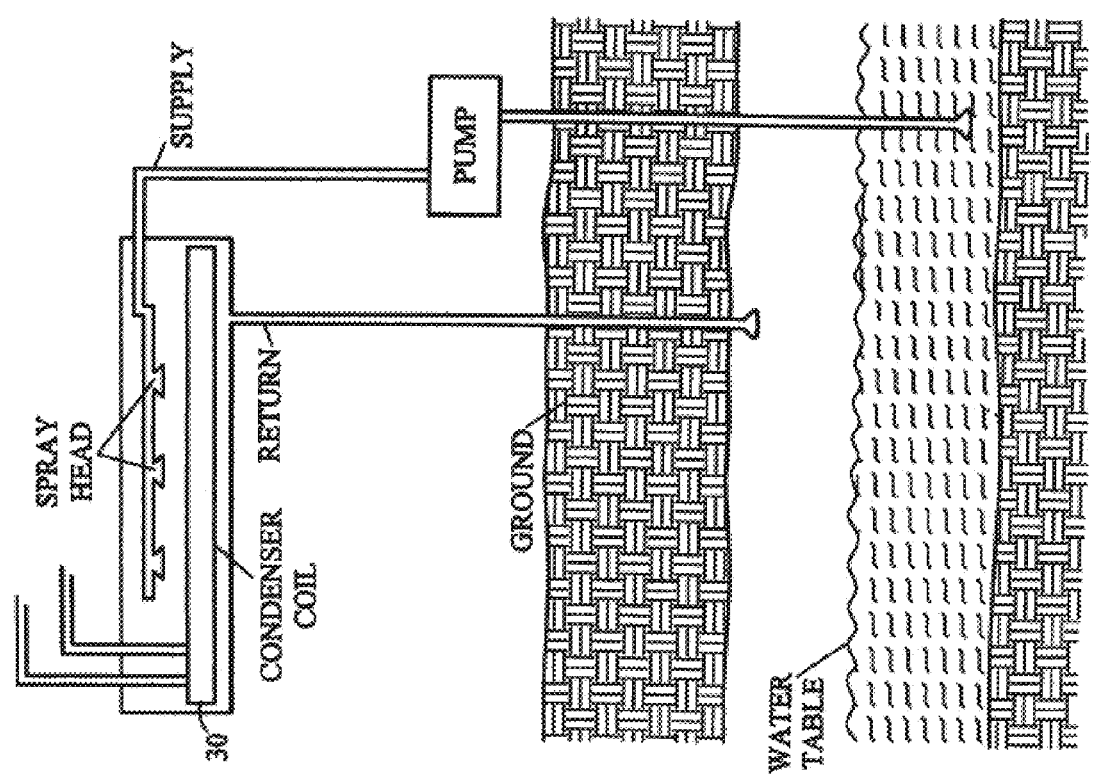
FIG. 15 is a diagram for allowing a condenser coil of the present invention system to dissipate heat to ground water from a water table.

Another embodiment or method that can be used with the present invention system is illustrated in FIG. 15. In this method, condenser coil 30 may dissipate heat to water circulated over its surface. The water can be drawn by a pump from an underground water table. The underground water temperature can be approximately twenty-five (25° F.) degrees Fahrenheit cooler than the atmosphere. Other degree differences can also be selected and are considered within the scope of the invention. Thus, the efficiency of the heat dissipation and of the overall cooling is enhanced. This method might circulate water from the water table. Alternatively, water can be sprayed as a mist onto the condenser in its own external evaporation cycle of liquid to gas.

It should be recognized that other concentrators can be used with the present invention system and all are considered within the scope of the invention. Certain examples of concentrators are generally shown in the figures but are not considered to limit the types of concentrators that can be used and incorporated into the present invention system. Though shown with four concentrators for illustrative purposes, the present invention is not considered limited to any apparent size for or number of concentrators and various sizes and number of concentrators can be used and are considered within the scope of the invention. The area, in square feet, of the concentrators is discussed above in connection with the parent application for which this application claims priority to and which has now issued as U.S. Pat. No. 7,451,611

With reference now to FIG. 10, a perspective view of a dish concentrator 500 that can be used with the present invention system is shown. FIG. 11 is a partial cutaway perspective view of a ceramic coil pickup unit 502 of dish concentrator 500 illustrating the internal ceramic spiral coil. FIG. 12 is a perspective view of a solar receiver and heat-engine housing collectively referenced at numeral 520. FIG. 13 illustrated a parabolic trough concentrator 530 and FIG. 14 illustrates a Fresnel lens concentrator 540.

The above-described and illustrated rotary positive displacement valves provide a unique valve design which can be advantageously optimized for the instant invention system. The movement under pressure of a gas or liquid, such as, but not limited to, a refrigerant in liquid or gas form, acting co-operatively with the electromotive force (motors) causes the rotation of the valves. Preferably composed of four chambers in a four vane version, each vane chamber successively is filled and caused to rotate by the motors and high side pressure on that chamber vane. The chamber is then closed by the following vane and finally emptied as such chamber is decreased in volume due to the preferred offset center, the point of co-incidence of the inner cylinder rotor and the vane and placement of the exit port. The valves 40, 110 of the present invention are driven partially by the pressure of the heated gas plus the electromotive force. Preferably, two valves are connected together, with the high side and the low side all given stability to the refrigerant movement through the circuit. Additionally, the valves 40, 110 may be disconnected by use of the above-described clutch. Further, the valves 40, 110 may operate independently dictated by sensors and a computer to attain ideal system pressures throughout the refrigerant cycle. In solar heat mode, the valves may be motor driven to promote circulation of the heated refrigerant.

Thus in one embodiment, a rotational multi-vane positive displacement valve is disclosed which can comprise: an outer cylindrical valve body housing having an inlet port and an outlet port and an inner rotational cylinder disposed within the outer cylindrical valve body housing and supported by a longitudinal shaft offset from a center position of the outer housing. The inner rotational cylinder can have a plurality of spring loaded vanes along a substantial portion of its longitudinal axis that are preferably equally spaced around a circumference of the inner rotational cylinder. The outlet port can be located at least 180 degrees in direction of rotation from the inlet port, when the inner cylinder has four vanes.

Thus, summarizing the present invention provides a solar air-conditioning system that is preferably designed to operate with concentrated solar heat and uses a circulating refrigerant in a cycle of compression and expansion. Solar concentrators raise the temperature and pressure of the refrigerant, which is confined between the two valves 40, 110. The valves 40, 110 are caused to rotate, thereby advancing the heated refrigerant to the condenser, where the heat is radiated or otherwise transferred to the atmosphere. The refrigerant then proceeds to the evaporator coil, which is located within a water tank containing at least 2000 gallons of an anti-freeze water solution. As the water is the storage medium, heat can be added to or extracted from the storage medium by the evaporator coil. A radiator pickup coil is also located within the water tank and is part of a separate chilled water system which can circulate its own water supply through other radiators located throughout a dwelling. Additionally, one or more bypass valve(s) within the refrigerant system allow switching to solar heating.

It should be recognized that the rotary valves of the present invention form an integral and unique component of the invention as a whole. The valves provide unique a function of confining the refrigerant until sufficient solar energy is absorbed. Features, including, but not limited to, an inner rotating cylinder offset the center of an outer housing, the point of coincidence with the outer housing and port placement. Such valves can be advantageously optimized for use with the present invention system. The refrigerant acts cooperatively with electric motors and causes the rotation of the valve pair. Preferably composed of four chambers in a four vane version, each vane chamber successively is filled and caused to rotate by the high side pressure on that chamber vane and the electric motors. Then the chamber is closed by the following vane and finally emptied as the chamber is decreased in volume due to the offset center, the point of co-incidence of the inner cylinder rotor and the vane and the placement or location of the exit port. The valves in the present invention system are preferably driven by electric motors and the pressure of the heated gas. Preferably, in certain embodiments of the present invention system, two valves are connected together, namely, the high side and the low side, all to provide stability to the refrigerant movement through the circuit. In certain conditions, the valves may be disconnected from each other.

The air conditioning (cooling) mode may be switched to solar heating. In this mode the valves may be motor driven to circulate heated refrigerant.

With respect to the solar concentrators used with the present invention system, it is expected that the solar concentrators can generate refrigerant temperatures in the 400 degrees centigrade range (around 1000 degrees Fahrenheit) with a corresponding rise in refrigerant pressure. A radiator/condenser can be provided to dissipate such heat. This high pressure refrigerant gas is conducted to the expansion valve in the evaporator via the high pressure rotary valve and the condenser. Multiple evaporators may also be provided for use during peak pressures.

It is expected that the average working temperatures in the water tank can be well below the freezing point of water. An anti-freeze mixture prevents the water storage medium from freezing.

It should also be recognized that under certain solar conditions the rotary valves, and in another embodiment a valve and a compressor, may be driven by associated electric motors in cooperation with the solar concentrators.

Thus, the present invention provides a rotary valve preferably having a rotating cylinder incorporating a multitude of longitudinally placed and equally spaced spring loaded vanes. In the preferred embodiment, four vanes are provided, though such is not considered limiting. The cylinder can be located within a circular outer housing and offset from the centerline of the outer housing. The inner cylinder can be co-incident with the outer housing at one point. Rotation of the inner cylinder results in the vanes following the outer housing inner surface by action of the springs exerting a push force against the vane. The area between the vanes will vary throughout rotation due to the offset from center. The varying area feature is used to forcefully expel, and to draw by vacuum, the refrigerant.

The outer housing incorporates inlet and outlet ports by which the refrigerant enters and exits the valve. These inlet and outlet ports can be located respectively and approximately ninety degrees from the point of coincidence of the cylinder and housing.

As seen in FIG. 2, the outer housing can also incorporate a stationary spring loaded longitudinal vane 83 at the point of coincidence with the inner cylinder. This vane serves as a seal to isolate the inlet and outlet ports.

Preferably there are two valves (i.e., FIGS. 1-5), namely, a high pressure valve 40 receiving pressurized refrigerant from the solar concentrators and a low pressure valve 110 advancing refrigerant into the concentrators. The two valves 40, 110 are preferably connected together such that they rotate as one. The valves may be connected by a common shaft or in the preferred embodiment, by a common attachment to a motors and a clutch.

The high pressure gas from the solar concentrators and condenser enters the port of the high side valve creating a pressure against the vane in that area and combined with electromotive force causes rotation of the cylinder. With rotation the gas is captured in the area between vanes. With further rotation the area containing the gas approaches the exit port and the area is decreasing. As the point of co-incidence is approached, the gas is forced out of the valve and on to the condenser and to the expansion valve within the evaporator coil.

The low pressure valve draws gas from the low pressure side of the evaporator due to the expanding area behind the vane as it passes the inlet port. With rotation the area can be sealed by the following vane. The gas is contained between the vanes. With further rotation the forward vane passes the exit port near the point of co-incidence and the area between the vanes decreases. Gas is forced out of the exit port and proceeds to the concentrators to repeat the cycle.

The motors attached to valves 40, 110 may be used to assist refrigerant circulation in times of less pressure as solar energy varies. Energy to operate the motor(s) may be drawn from a battery and controlled by a computer.

Figure 20:
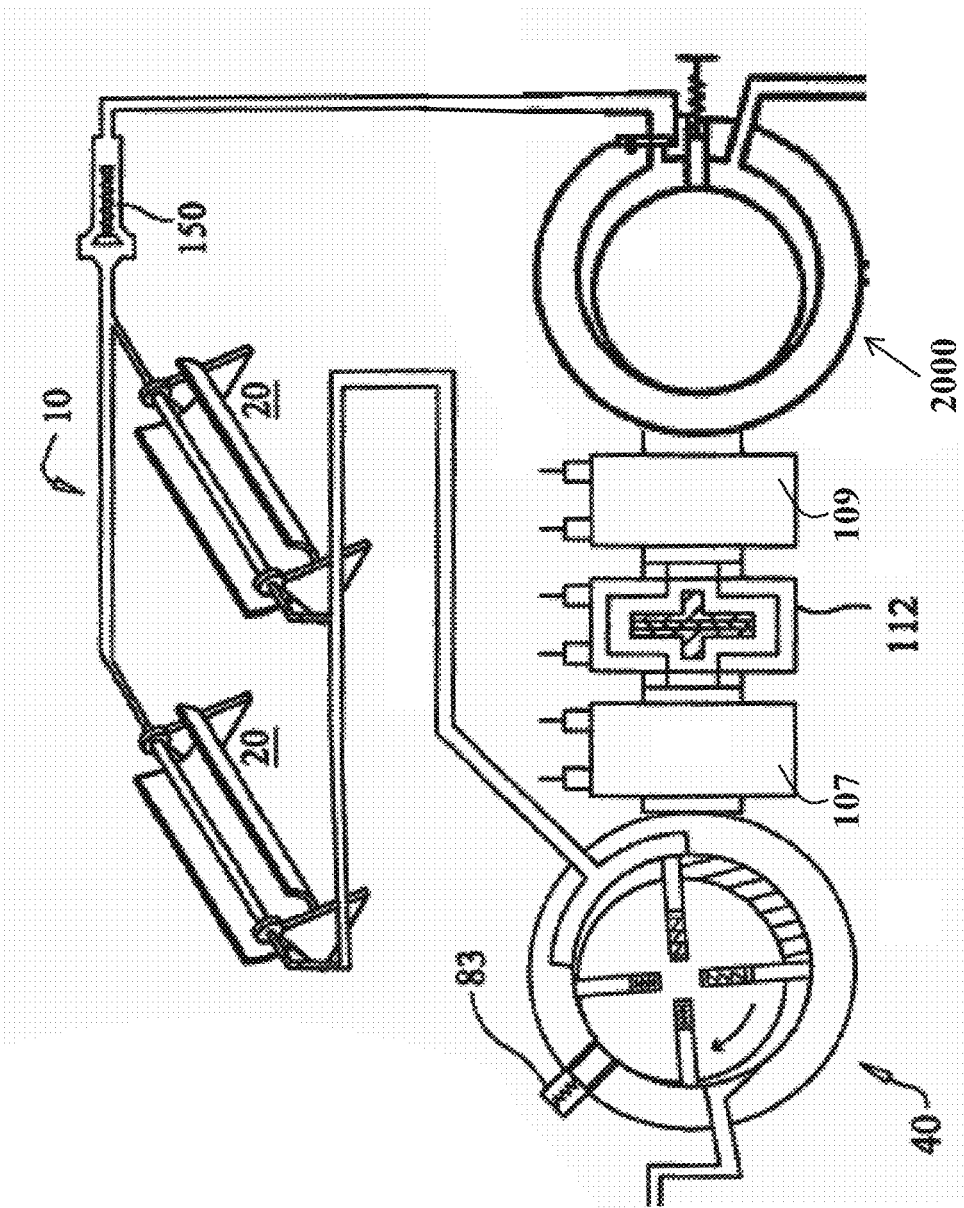
FIG. 20 illustrates a partial schematic/flow diagram with a conventional compressor in place of low pressure rotary valve in accordance with another embodiment of the present invention.

In an alternative design for the present invention, as shown in FIG. 20, a conventional compressor 2000 is used in place of low pressure rotary valve 110. Thus, the refrigerant circulation system is driven by positive displacement rotary valves, such as, a high side 40 and low side 110 or one rotary valve 40 and a conventional compressor 2000 (shown in FIG. 20). These valves and/or compressor 140 can be connected together by a common shaft 69 and are also provided with a conventional means for disconnecting from each other, such as, by an electrically operated clutch 112 (shown in an engaged position). Preferably, each valve and/or compressor can be provided with an electric motor 107 and 109, respectively.

In the intermittent solar energy third regime, such as where there are passing clouds, rain, etc., a variety of combinations of solar and electrical energy may be combined to circulate the refrigerant. As solar energy fluctuates downward, the motor associated with low side rotary valve 110 or compressor 2000 will drive such low pressure valve 110 or compressor 140. Disengagement of the high pressure rotary valve 40 using clutch may or may not be needed and can depend on the amount of solar energy and pressures throughout the refrigerant circuit.

Electrical energy into the motors and clutch is supplied as required in order to promote the circulation of the refrigerant. The amount of electrical energy can be determined by pressure and temperature sensors within the refrigerant circuit.

FIG. 3 is illustrates one embodiment of the present invention system installed in connection with a dwelling 501 and showing alternate condenser 503 on an exterior sidewall 505 of dwelling 501 and semi-cylinder or concentrators 509 on roof 507.

As seen in FIG. 2 a schematic/flow diagram is shown for another embodiment of the present invention system with a single conventional condenser 30a shown in the upper left hand corner. Condenser 30a can be conventionally designed and positioned such that it receives the output from the first rotary valve 40, such that the, heated and pressurized refrigerant from concentrators 20 can go directly to first rotary valve 40 and then to condenser 30a and then to the expansion valve 90 in the evaporator 80. The rotary valves 40 and 110 are shown in schematic form. Though two solar concentrators 20 are shown, such is for illustrative purposes only and in use it is expected that the actual number of solar concentrators 20 would exceed more than the number shown in the FIGS. 1-3.

A plurality of motors and clutch can be provided, separately and together can be with appropriate sensors, computer controlled to maintain circulation of the refrigerant, as the solar energy varies. The motors may at times add rotational energy so that the refrigerant moves as desired or they may add a retarding force to accumulate solar energy in the high side and attain desired pressures within the circuit. Additionally, the clutch may be disengaged, allowing independent operation of each valve 40, 110 to optimize pressure.

Sensors can be provided throughout the system to provide pressure information to the controller.

FIGS. 1 and 2 illustrate non-limiting versions of the circuit of the present invention, and for FIG. 3 in connection with a dwelling 501 showing the solar concentrators 509 disposed on roof 507 and a condenser coil (heat dissipater) 503 mounted (preferably vertically) to a wall 505 of dwelling 501. Rotary valves 40 and 110 are shown in schematic/diagrammatic for FIGS. 1 and 2 and in a non-limiting representative form for FIG. 3.

A novel aspect of the two-valve configuration of the present invention is the uniqueness of both valves being mechanically coupled to each other in view of the offset shaft, which supports the vanes, can be supported by bearings in an endplate and which can be flush with the endplate. As a non-limiting example, to mate the two rotational valves together, or the motor to a valve, each shaft could employ a square hole that is fitted to a square joining pin, or a splined pin or shaft segment. This configuration can be used for joining the offset shafts of the valves or a motor to a valve. The end of each respective shaft can be correspondingly fitted with splined openings. Other conventional methods for joining the two rotating shafts can also be employed and are also considered within the scope of the invention. Rotation of the valves can be as a result of an electric motor incorporated in the valve pair unit and the raised pressure from the solar concentrators.

The valves are preferably part of a closed-system refrigerant circuit (closed to the outside environment). The first and second one way rotary valves can be mechanically coupled to each other such that they both rotate as one and that a pressurized circuit is maintained for the closed-system refrigerant circuit.

Furthermore, the condenser can be in the high-side part of the circuit and serves to remove heat from the refrigerant. The condenser could be fitted with a fan (shown in FIG. 1) or a circulating ground water system (shown in FIG. 15) or simply by a design of very large area to dissipate the heat (shown in FIG. 3).

The above-described systems of the present invention can also be used for or applicable to large area coolers or refrigerators and provides a device which can provide refrigeration to areas where electricity is not present or available.

It should be recognized that certain features of one embodiment of the present invention system can be combined with other features of another embodiment of the present invention system to form a further embodiment of the present invention system.

With reference back to FIGS. 1 and 3, one advantageous feature of the present invention is the insulated tank 100. More specifically, the tank 100 is unique in that it stores energy, in using water temperatures well below the freezing point of water (with Antifreeze). As such, zero degrees Fahrenheit, and below, is possible. The tank 100 stores all solar energy collected and, in times where there are clouds or minimal solar energy, the temperature of the water tank continues to provide a source to draw cold air output to the dwelling without interruption. Therefore, the tank 100, combined with sufficient quantity of water, multiples the efficiency and the practicability of the instant invention. The temperature and quantity of the water in storage tank 100 are important elements to the present invention because they provide a means to supply air conditioning to a dwelling in times when solar energy is not produced.

Even more specifically, the cold water (potential energy) stored in the water tank 100 is important to the operation of the system because it provides practical operation of the system. It is practical from the standpoint of cost and complexity, i.e., water with anti-freeze is inexpensive. Utilizing a large quantity of water (1000 gallons or more), coupled with temperatures well below the freezing point (anti-freeze mixture) of water extends operation of the system well beyond the hours in which solar energy is produced (into night). Utilizing a low temperature of water and volume of water in the tank has not been accomplished with prior-art system. The tank 100 allows utilization of very low temperatures well below the freezing point of water, which usually is to be avoided in those known air-conditioning systems. Specifically, they are avoided due to ice formation. Evaporative temperatures near 35 degrees Fahrenheit are utilized as the ideal range for conduction to the air. Without permitting below-freezing storage of water (anti-freeze) the system would have to be throttled back to limit temperatures above freezing. This would mean not utilizing all the solar energy at that time. Therefore, the tank 100 provides an efficient and effective alternative to those known systems.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention

The invention claimed is:

1. A solar air-conditioning and/or heating system comprising:
   a closed-system refrigerant circuit having:
      at least one solar heat concentrator directing solar energy to a portion of the refrigeration circuit, the refrigeration circuit having a refrigerant disposed within;
      at least one of a first rotational multi-vane valve and a first solenoid valve with an inlet port and an outlet port, the inlet port located downstream of the portion of the refrigeration circuit directed with solar energy;
      at least one heat dissipater located downstream of the outlet port of the at least one of the first rotational multi-vane valve and the first solenoid valve;
      an evaporator having an evaporator coil downstream of the at least one heat dissipater;
      at least one of a second rotational multi-vane valve and a second solenoid valve with an inlet port and an outlet port, the inlet port located downstream of the evaporator; and
      a clutch and motor assembly coupled with the at least one of the first rotational multi-vane valve and the first solenoid valve and the at least one of the second rotational multi-vane valve and the second solenoid valve, the clutch and motor assembly operable to independently drive at least one of the at least one of the first rotational multi-vane valve and the first solenoid valve and the at least one of the second rotational multi-vane valve and the second solenoid valve;
   an energy storage apparatus storing an energy storage medium when the at least one heat dissipater is in use and having the evaporator located within the energy storage apparatus; and
   a chilled water system having:
      a pickup radiator with a radiator coil located within the energy storage apparatus;
      a liquid disposed within the chilled water system; and
      at least one heat exchanger dispersed throughout a building, the at least one heat exchanger with an inlet in communication with a fluid pump disposed within the chilled water system and outlet in communication with the pickup radiator.

2. The solar air-conditioning and/or heating system according to claim 1, wherein the first rotational multi-vane valve further comprises:
   a first inner cylinder having four vanes defining four isolated chambers within a first outer housing of the first rotational multi-vane valve.

3. The solar air-conditioning and/or heating system according to claim 2, wherein the second rotational multi-vane valve further comprises:
a first inner cylinder having four vanes defining four isolated chambers within a second outer housing of the second rotational multi-vane valve.

4. The solar air-conditioning and/or heating system according to claim 3, further comprising:
at least one of a motor and a clutch mechanically coupled with and disposed between the first outer housing and the second outer housing.

5. The solar air-conditioning and/or heating system according to claim 4, wherein:
the first rotational multi-vane valve and the second rotational multi-vane valve are operable to rotate simultaneously to facilitate circulation of the refrigerant through the refrigerant circuit.

6. The solar air-conditioning and/or heating system according to claim 1, wherein said energy storage apparatus is an insulated tank.

7. An energy storage apparatus for use in air-conditioning or heating system, comprising:
a container storing at least one thousand gallons of an energy storage medium;
an evaporator coil disposed within the container and energy storage medium, said evaporator consisting as part of a refrigerant circuit; and
a pickup radiator coil disposed within the container and energy storage medium, said pickup radiator coil consisting as part of a chilled water air conditioning water system for a dwelling, the chilled water air conditioning water system of a closed system independent of the refrigerant circuit.

8. The water tank of claim 7, wherein said container is insulated.

9. The water tank of claim 8, wherein said container is insulated by burying the container beneath ground level.

10. The water tank of claim 7, wherein said energy storage medium stored within said container is a mixture of water and anti-freeze.

11. The water tank of claim 7, wherein said container is greater in height than width.

12. A solar air-conditioning and/or heating system incorporating at least one one-way rotary valve, comprising:
(i) a closed-system refrigerant circuit comprising:
at least one solar heat concentrator;
at least one heat dissipater in communication with the at least one one-way rotary valve;
a first one-way rotary valve in communication with the at least one heat dissipater; said first one-way rotary valve comprising an outer cylindrical valve body housing having an inlet port and an outlet port, an inner rotational cylinder disposed within said outer cylindrical valve body housing and supported by a longitudinal shaft offset from a center position of said outer housing, said inner rotational cylinder having a plurality of spring loaded vanes along a substantial portion of its longitudinal axis equally spaced around a circumference of said inner rotational cylinder and defining isolated chambers within said outer cylindrical valve body housing, said inner rotational cylinder co-incident with said outer cylindrical valve body at one point;
a clutch and motor assembly coupled with the first one-way rotary valve and operable to independently drive the first one-way rotary valve; and
an evaporator having an evaporator coil in communication with the at least one heat dissipater; and
(ii) a refrigerant disposed within and circulating through said refrigerant circuit;
(iii) an insulated tank storing at least approximately 2000 gallons of a liquid, said evaporator located within the tank;
(iv) a motor for driving the compressor; and
(v) a chilled water system comprising:
a pickup radiator having a radiator coil located within the tank;
a fluid pump in communication with said radiator;
one or more radiators dispersed throughout a dwelling, each radiator having an inlet in communication with said liquid pump and each radiator having an outlet in communication with said pickup radiator; and
a liquid, having an anti-freeze component, disposed within said chilled water system.

13. The solar air-conditioning and/or heating system of claim 12, further comprising a compressor having an inlet in communication with the evaporator outlet and having a compressor outlet in communication with said one or more solar heat concentrators.

14. The solar air-conditioning and/or heating system of claim 12, wherein said one or more heat dissipaters secured to an external wall of a dwelling.

* * * * *